US010969034B2

(12) United States Patent
John et al.

(10) Patent No.: US 10,969,034 B2
(45) Date of Patent: Apr. 6, 2021

(54) INFLATION ELECTRIC VALVE WITH MANUAL OVERRIDE

(71) Applicant: Goodrich Corporation, Charlotte, NC (US)

(72) Inventors: Poly Puthur John, Kerala (IN); Akash Khare, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/418,855

(22) Filed: May 21, 2019

(65) Prior Publication Data

US 2020/0300380 A1 Sep. 24, 2020

(30) Foreign Application Priority Data

Mar. 22, 2019 (IN) .............................. 201911011202

(51) Int. Cl.

| *F16K 31/122* | (2006.01) |
| *F16K 31/42* | (2006.01) |
| *F16K 31/46* | (2006.01) |
| *F16K 31/143* | (2006.01) |
| *F16K 39/02* | (2006.01) |
| *F16K 31/14* | (2006.01) |
| *F15B 13/043* | (2006.01) |
| *F16K 27/08* | (2006.01) |

(52) U.S. Cl.
CPC ........ *F16K 31/1223* (2013.01); *F15B 13/043* (2013.01); *F16K 31/14* (2013.01); *F16K 31/143* (2013.01); *F16K 31/42* (2013.01); *F16K 31/465* (2013.01); *F16K 39/022* (2013.01); *F16K 27/08* (2013.01)

(58) Field of Classification Search
CPC ...... F16K 31/1223; F16K 31/14; F16K 31/42; F16K 31/465; F16K 31/143; F16K 27/08; F16K 39/022; F15B 13/043
USPC .......... 251/30.01, 30.05, 63.4, 129.03; 222/3
See application file for complete search history.

(56) References Cited

U.S. PATENT DOCUMENTS

| 2,398,775 | A | * | 4/1946 | Beekley | ................... | F16K 31/42 |
| | | | | | | 251/26 |
| 2,830,784 | A | * | 4/1958 | Placette | ................ | F16K 31/363 |
| | | | | | | 251/14 |
| 3,400,735 | A | * | 9/1968 | Favors | ................... | F16K 15/202 |
| | | | | | | 137/557 |
| 3,980,270 | A | * | 9/1976 | Thomas | ................. | A62C 35/02 |
| | | | | | | 251/30.01 |

(Continued)

*Primary Examiner* — Matthew W Jellett
(74) *Attorney, Agent, or Firm* — Cantor Colburn LLP

(57) ABSTRACT

An inflation valve is provided and includes a valve defining main and command cavities and including first and second valve portions and a valve seat defining an outlet, a poppet disposed in the main cavity and including first and second rods to engage with the first valve portion and to extend through the valve seat and the second valve portion, respectively, and a piston disposed in the command cavity and a solenoid valve. The solenoid valve normally prevents main cavity-command cavity fluid flow to engage the poppet with the valve seat by fluid pressure acting on the poppet in the main cavity and permits the main cavity-command cavity fluid flow when energized to disengage the poppet from the valve seat by balanced fluid pressure acting on the poppet in the main cavity and on the piston in the command cavity to permit main cavity-outlet fluid flow.

20 Claims, 2 Drawing Sheets

(56) References Cited

U.S. PATENT DOCUMENTS

| | | | | |
|---|---|---|---|---|
| 6,024,114 | A * | 2/2000 | Thomas | F16K 31/1223 |
| | | | | 137/244 |
| 8,960,222 | B2 * | 2/2015 | Holbeche | F17C 13/04 |
| | | | | 137/505.11 |
| 9,573,557 | B2 * | 2/2017 | Wolf | F16K 31/42 |
| 10,612,677 | B2 * | 4/2020 | John | F16K 31/0675 |
| 10,670,163 | B1 * | 6/2020 | Yu | F16K 31/42 |
| 2017/0029081 | A1 * | 2/2017 | Michalski | B63C 9/19 |
| 2019/0353263 | A1 * | 11/2019 | John | F16K 31/42 |

* cited by examiner

INFLATION ELECTRIC VALVE WITH MANUAL OVERRIDE

CROSS REFERENCE TO RELATED APPLICATION

This application claims the benefit of Indian Patent Application No. 201911011202, filed Mar. 22, 2019, which is incorporated herein by reference in its entirety.

BACKGROUND

The following description relates to inflation valves and, more particularly, to an inflation electric valve with a manual override.

Pneumatic inflation systems make use of high pressure stored gas that is to be discharged within a specified time by the opening of a normally closed valve. Typically, inflation valves provided within pneumatic inflation systems are a kind of flow isolation valves that are actuated by mechanical or electrical devices. Currently, electrical actuation devices are often provided as squib initiators.

In an inflation valve with a squib initiator, a main valve is assembled to a gas bottle and a spool is provided with radial seals. In the normal closed position of the inflation valve, inlet fluid pressure acts at the spool in the opening direction. This is retained by the friction force generated at the interface of the spool with an actuator piston rod (i.e., by a latching of the valve opening force by mechanically engaging the actuator piston rod at a top face of spool). An electrical squib is used to actuate an opening of the main valve. Once the main valve opened by the actuation caused by the squib initiator, the opening position of the valve is sustained by fluid pressure force acting at the spool.

Squib initiators are single shot devices and can have regulatory issues that lead to a greater demand for squib initiators to be pneumatic. Such pneumatic squib initiators require the use of elastomer O-ring seals for internal leak tightness in the normal closed position. The O-ring seals have limited lifetimes, however, as they experience frequent compression and exposure to extreme operating temperatures. Also, an inflation valve using a pneumatic squib initiator cannot be checked or tested because it needs to be dismantled and provided with a new pneumatic squib initiator once it is actuated.

BRIEF DESCRIPTION

According to an aspect of the disclosure, an inflation valve is provided and includes a valve defining main and command cavities and including first and second valve portions and a valve seat defining an outlet, a poppet disposed in the main cavity and including first and second rods extending therefrom to engage with the first valve portion and to extend through the valve seat and the second valve portion, respectively, and a piston coupled with the second rod and disposed in the command cavity and a solenoid valve to normally prevent main cavity-command cavity fluid flow to engage the poppet with the valve seat by fluid pressure acting on the poppet in the main cavity and to permit the main cavity-command cavity fluid flow when energized to disengage the poppet from the valve seat by balanced fluid pressure acting on the poppet in the main cavity and on the piston in the command cavity to permit main cavity-outlet fluid flow.

In accordance with additional or alternative embodiments, the first valve portion is attachable to a pressurized container and defines through-holes by which the pressurized container pressurizes at least the main cavity.

In accordance with additional or alternative embodiments, the valve further includes a manifold along which the solenoid valve is disposed and by which the main and command cavities are fluidly communicative when the solenoid valve is energized.

In accordance with additional or alternative embodiments, a manual actuator is manually operable to disengage the poppet from the valve seat to permit the main cavity-outlet fluid flow.

In accordance with additional or alternative embodiments, the manual actuator is anchored on the second valve portion to engage with the second rod.

In accordance with additional or alternative embodiments, the manual actuator includes a pull tab, a fulcrum and a lever which is pivotable about the fulcrum to engage with the second rod upon an external force acting on the pull tab.

In accordance with additional or alternative embodiments, the valve seat includes a first flat surface and the poppet includes a second flat surface corresponding to the first flat surface.

In accordance with additional or alternative embodiments, the first rod has a larger diameter than the second rod.

In accordance with additional or alternative embodiments, the balanced fluid pressure arises from the first rod having a larger diameter than the second rod.

In accordance with additional or alternative embodiments, the inflation valve further includes a first seal by which the first rod sealably engages with the first valve portion, a second seal by which the second rod sealably engages with the valve seat, a third seal by which the piston sealably engages with the second valve portion in the command cavity, a fourth seal by which the second rod sealably engages with the piston and a fifth seal by which the second rod sealably engages with the second valve portion.

According to another aspect of the disclosure, an inflation valve is provided and includes a valve defining main and command cavities and including first and second valve portions and a valve seat defining an outlet, a poppet disposed in the main cavity and including first and second rods extending therefrom to engage with the first valve portion and to extend through the valve seat and the second valve portion, respectively, and a piston coupled with the second rod and disposed in the command cavity and a solenoid valve. The solenoid valve is configured to normally prevent main cavity-command cavity fluid flow to thereby cause the poppet to engage with the valve seat by fluid pressure acting on the poppet in the main cavity and is configured to permit the main cavity-command cavity fluid flow when energized to thereby cause the poppet to disengage from the valve seat by balanced fluid pressure acting on the poppet in the main cavity and on the piston in the command cavity to permit main cavity-outlet fluid flow.

In accordance with additional or alternative embodiments, a manual actuator is manually operable to disengage the poppet from the valve seat to permit the main cavity-outlet fluid flow.

According to another aspect of the disclosure, an inflation valve is provided and includes a pressurized container, a valve defining main and command cavities and including a first valve portion defining through-holes by which the pressurized container pressurizes at least the main cavity, a second valve portion and a valve seat defining an outlet, a poppet disposed in the main cavity and including first and second rods extending therefrom to engage with the first valve portion and to extend through the valve seat and the second valve portion, respectively, and a piston coupled with the second rod and disposed in the command cavity, a solenoid valve and manual actuator. The solenoid valve normally prevents main cavity-command cavity fluid flow to engage the poppet with the valve seat by fluid pressure acting on the poppet in the main cavity and permits the main cavity-command cavity fluid flow when energized to disengage the poppet from the valve seat by balanced fluid pressure acting on the poppet in the main cavity and on the piston in the command cavity to permit main cavity-outlet fluid flow. The manual actuator is manually operable to disengage the poppet from the valve seat to permit the main cavity-outlet fluid flow.

In accordance with additional or alternative embodiments, the valve further includes a manifold along which the solenoid valve is disposed and by which the main and command cavities are fluidly communicative when the solenoid valve is energized.

In accordance with additional or alternative embodiments, the manual actuator is anchored on the second valve portion to engage with the second rod.

In accordance with additional or alternative embodiments, the manual actuator includes a pull tab, a fulcrum and a lever which is pivotable about the fulcrum to engage with the second rod upon an external force acting on the pull tab.

In accordance with additional or alternative embodiments, the valve seat includes a first flat surface and the poppet includes a second flat surface corresponding to the first flat surface.

In accordance with additional or alternative embodiments, the first rod has a larger diameter than the second rod.

In accordance with additional or alternative embodiments, the balanced fluid pressure arises from the first rod having a larger diameter than the second rod.

In accordance with additional or alternative embodiments, the inflation valve further includes a first seal by which the first rod sealably engages with the first valve portion, a second seal by which the second rod sealably engages with the valve seat, a third seal by which the piston sealably engages with the second valve portion in the command cavity, a fourth seal by which the second rod sealably engages with the piston and a fifth seal by which the second rod sealably engages with the second valve portion.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a new inflation valve is provided and can be operated electrically using a pilot solenoid valve or manually using a pull cable. Once the valve is opened fully, the opened position will be sustained by fluid pressure force inside the valve and actuation force can be cut off. The valve has repeatable operational features and built-in test features which are not available in currently used inflation valves. The valve includes a flat poppet-type pneumatic valve with pressure balancing features in a valve cavity. The pilot solenoid valve actuates a pneumatic piston actuator that is integrated with the valve poppet. The manual pull cable is separately assembled to actuate the valve poppet.

Figure 1:
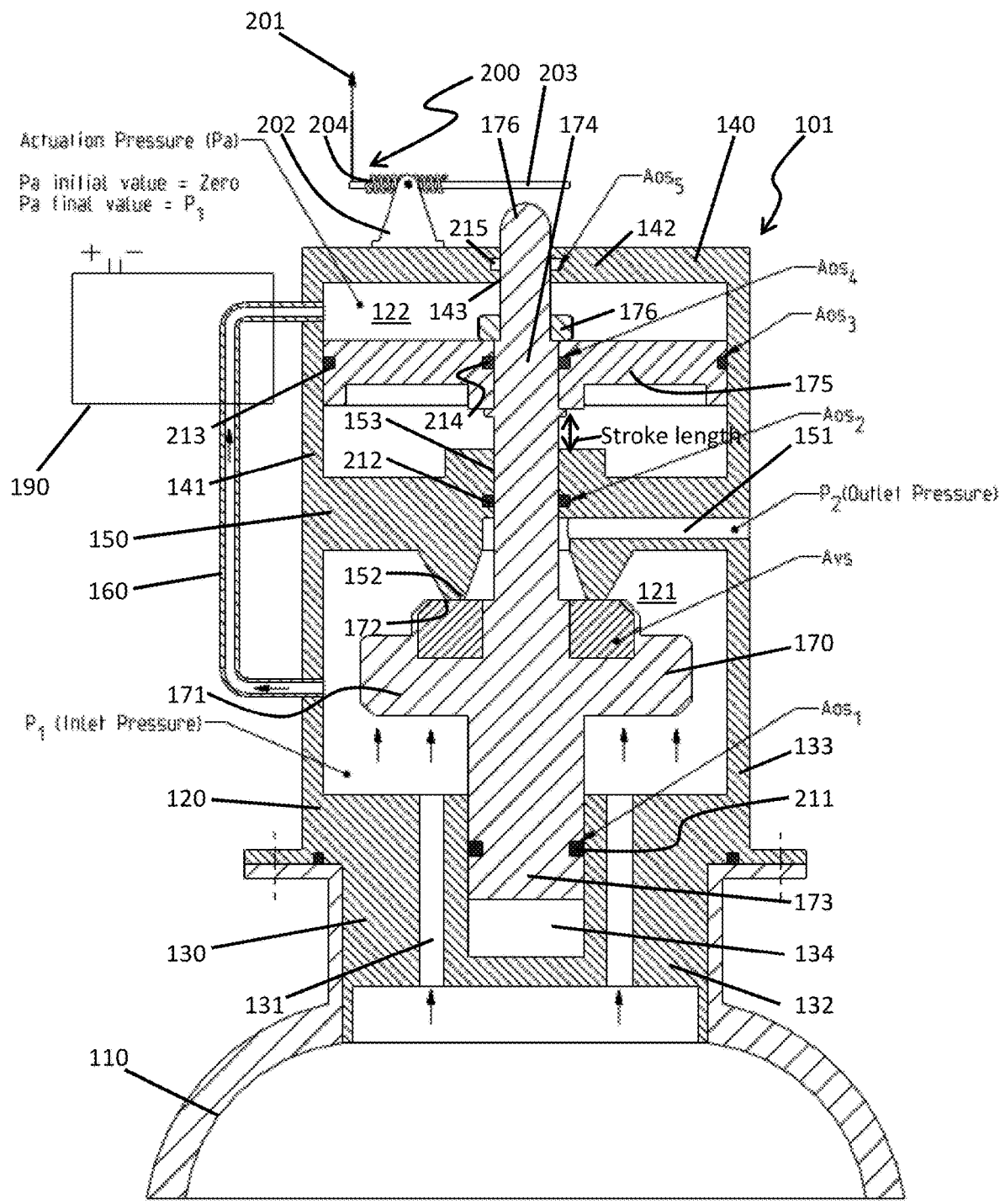
FIG. 1 is a side schematic view of an inflation valve in a closed condition in accordance with embodiments.
Figure 2:
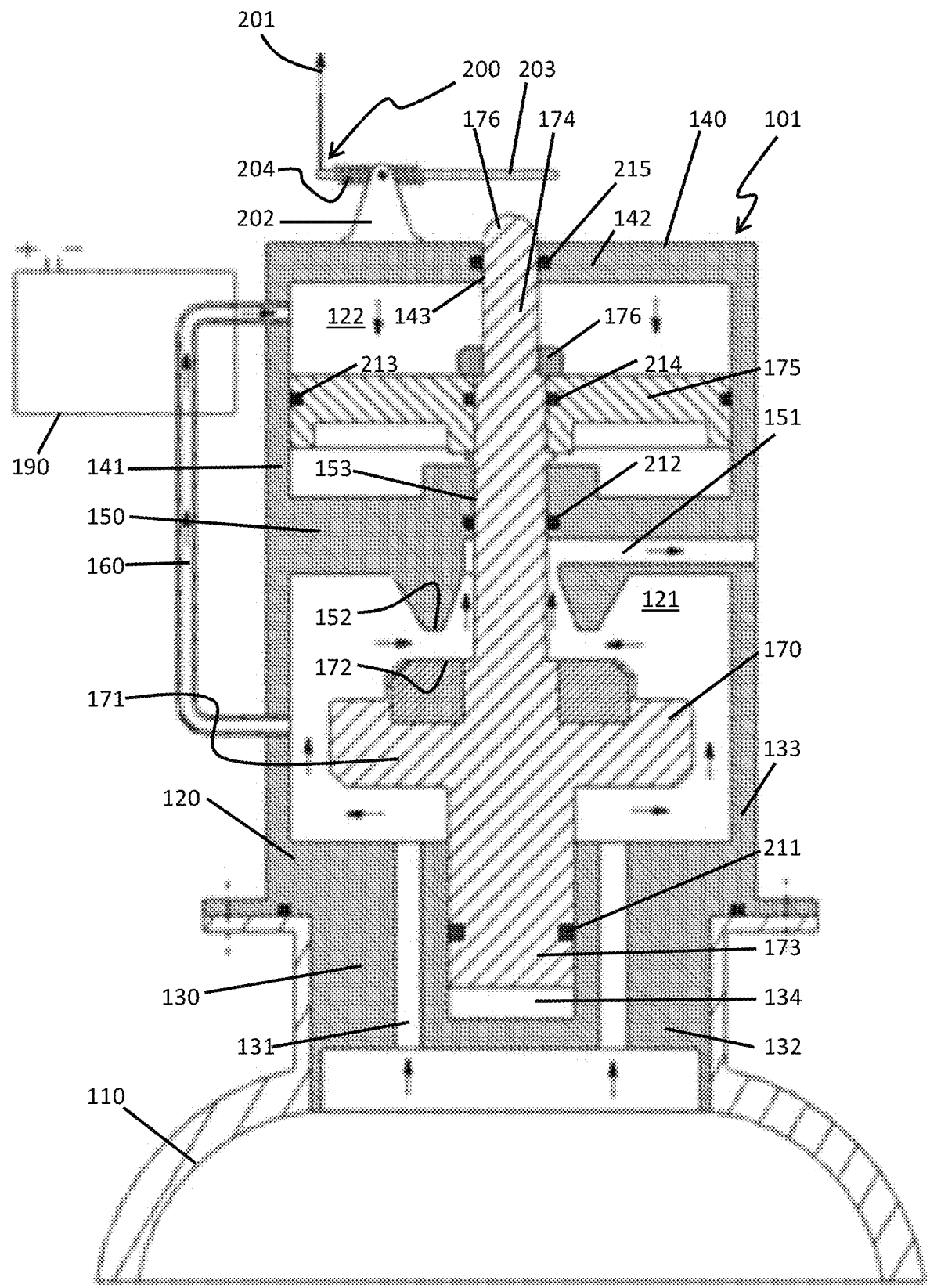
FIG. 2 is a side schematic view of the inflation valve of FIG. 1 in an open condition.

With reference to FIGS. 1 and 2, an inflation valve 101 is provided and includes a pressurized container 110, such as a gas bottle that contains gas or fluid under pressure for pressurizing an inflatable element, a valve 120, a poppet 170, a solenoid valve 190 and a manual actuator 200. The valve 120 is formed to define a main cavity 121 and a command cavity 122 and includes a first valve portion 130, a second valve portion 140, a valve seat 150 that is formed to define a radially oriented outlet 151 fluidly communicative with the inflatable element and a manifold 160. The first valve portion 130 is connectable with the pressurized container 110 and is formed to define through-holes 131 by which the pressurized container 110 is able to pressurize at least the main cavity 121 (i.e., when the inflation valve 101 is closed) and by which the pressurized container 110 is able to pressurize the main cavity 121 and the command cavity 122 while also providing for flow through the outlet 151.

The first valve portion 130 includes a thick base section 132 and sidewalls 133. The through-holes 131 extend through the thick base section 132. A guide cavity 134 is defined in the thick base section 132 to extend from the main cavity 121. The sidewalls 133 extend from the thick base section 132 to support the valve seat 150. The valve seat 150 extends across the valve 120 and includes an annular projection with a first flat surface 152. The valve seat 150 is formed to define an annular space that is fluidly communicative with the outlet 151 within the annular projection. The valve seat 150 is further formed to define a through-hole 153 which corresponds in position to the annular space. The second valve portion 140 includes sidewalls 141 that extend from the valve seat 150 and a lid section 142 that is supported by the sidewalls 141. The lid section 142 is formed to define a through-hole 143 which corresponds in position to the through-hole 153. The manifold 160 extends from the main cavity 121, through the sidewalls 133 and the sidewalls 141 to the command cavity 122. The solenoid valve 190 is disposed along the manifold 160.

The poppet 170 includes a poppet member 171, which is disposed in the main cavity 121. The poppet member 171 includes a second flat surface 172 that faces and corresponds in position to the first flat surface 152. The poppet 170 further includes a first, large diameter rod 173, a second, small diameter rod 174 and a piston 175. The first, large diameter rod 173 has a larger diameter than the second, small diameter rod 174. The first, large diameter rod 173 extends from a lower surface of the poppet member 171 to extend into the guide cavity 134 to thus sealably engage with the first valve portion 130. The second, small diameter rod 174 extends from an upper surface of the poppet member 171 through the through-hole 153 of the valve seat 150 and through the through-hole 143 of the lid section 142 of the second valve portion 140. A distal tip 176 of the second, small diameter rod 174 is exposed through the lid section 142. The piston 175 is coupled with the second, small diameter rod 174 by nut 176, which secures the piston 175 against a flange of the second, small diameter rod 174, and is sealably disposed in the command cavity 122 to delimit a lower extent of the command cavity 122.

The region delimited between the piston 175, the valve seat 150 and the sidewalls 141 can be provided as a dummy cavity that can be used as a test cavity. To this end, a test port can be formed in the sidewalls 141.

As shown in FIG. 1, the solenoid valve 190 is normally de-energized and, as such, normally prevents fluid flow from the main cavity 121 to the command cavity 122 by blocking the fluid flow along the manifold 160. This effectively causes the second flat surface 172 of the poppet member 171 to form a hard seat land and to sealably engage with the first flat surface 152 of the valve seat 150 by or due to fluid pressure provided by the gas or fluid of the pressurized container 110 acting on the poppet member 171 in the main cavity 121.

As shown in FIG. 2, when the solenoid 190 is energized, the solenoid 190 permits the fluid flow from the main cavity 121 to the command cavity 122. This effectively causes the second flat surface 172 of the poppet member 171 to disengage from the first flat surface 152 of the valve seat 150 by or due to balanced fluid pressure provided by the gas or fluid of the pressurized container 110 acting on the poppet member 171 in the main cavity 121 and on the piston 175 in the command cavity 121. In turn, the disengagement of the second flat surface 172 of the poppet member 171 from the first flat surface 152 of the valve seat 150 effectively permits fluid flow from the pressurized container 110 into and through the main cavity 121 and from the main cavity 121, through the annular space around the cylindrical shape of the second, small diameter rod 174 and to and through the outlet 151.

As will be explained further below, the balanced fluid pressure of the open condition of FIG. 2 arises from the first, large diameter rod 173 having a larger diameter than the second, small diameter rod 174.

The stroke length of the inflation valve 101 between the closed condition of FIG. 1 and the open condition of FIG. 2 is illustrated in FIG. 1.

The manual actuator 200 is manually operable to disengage the second flat surface 172 of the poppet member 171 from the first flat surface 152 of the valve seat 150. This, in turn, effectively permits fluid flow from the pressurized container 110 into and through the main cavity 121 and from the main cavity 121, through the annular space and to and through the outlet 151.

The manual actuator 200 is anchored on the lid section 142 of the second valve portion 140 to engage with the distal tip 176 of the second, small diameter rod 174. In accordance with embodiments, the manual actuator 200 can include a pull tab 201, a fulcrum 202 supported on the lid section 142 and a lever 203. The lever 203 is pivotable about the fulcrum 202 to engage with the distal tip 176 of the second, small diameter rod 174 upon an external force acting on the pull tab 201 (i.e., an operator pulling on the pull tab). A torsion spring 204 can be provided on the lever 203 to resist abusive loads acting on the lever 203.

The inflation valve 101 further includes a first seal 211 by which the first, large diameter rod 173 sealably engages with the first valve portion 130, a second seal 212 by which the second, small diameter rod 174 sealably engages with the valve seat 150, a third seal 213 by which an exterior surface of the piston 175 sealably engages with the second valve portion 140 in the command cavity 122, a fourth seal 214 by which the second, small diameter rod 174 sealably engages with an interior surface of the piston 175 and a fifth seal 215 by which the second, small diameter rod 174 sealably engages with the lid section 142 of the second valve portion 140.

Each of the first, second, third, fourth and fifth seals 211, 212, 213, 214 and 215 can be provided as dynamic or fixed elastomeric O-ring seals or any other suitable type of seal. Sealing stress on each of the first, second, third, fourth and fifth seals 211, 212, 213, 214 and 215 is less than the yield limit of the sealing material. An interior diameter of the fourth seal 214 is greater than an interior diameter of the fifth seal 215. The first seal 211 seals the main cavity 121 when the inflation valve 101 is in the closed condition and a net force on the poppet 170 is in the closing direction due to the large diameter of the first, large diameter rod 173. The third, fourth and fifth seals 213, 214 and 215 seal the command cavity 122.

With the construction described above, the inflation valve 101 exhibits a first force balancing in the closed condition shown in FIG. 1. This first force balancing is effectively a net valve closing force Fc, where $Fc = P_1 * Avs - P_1 * Aos_1$. On the contrary, the inflation valve 101 exhibits an actuation force toward the open condition shown in FIG. 2. Here, the actuation force $Fa = Pa * Aos_3 - Pa * Aos_5$, where Pa is an actuation pressure having an initial value of zero and rises to $P_1$ once the solenoid 190 is energized.

A second force balancing is achieved by the inflation valve 101 in the open condition shown in FIG. 2. Here, actuation pressure Pa is equal to inlet pressure P1, net force in the opening direction is equal to $P_1 * Aos_1 + P_1 * Aos_3$, net force in the closing direction is equal to $P_2 * Aos_2$, a closing pressure force at the fifth seal 215 is equal to $P1 * Aos_5$, a closing pressure force equal to $P_1 * Avs$ is equal to zero and resultant force in the opening direction Fo is equal to $P_1 * Aos_1 + P_1 * Aos_3 - P_2 * Aos_2 - P_1 * Aos_5$. In case the solenoid valve 190 is then closed and $P_1 * Aos_3$ and $P_1 * Aos_5$ becomes zero, a sufficient opening force develops to sustain the open condition.

That is, once the solenoid valve 190 is energized, an actuation force starts to develop in the command cavity 122 and will be effective at the piston 175 in the opening direction and the fifth seal 215 in the closing direction. The net actuation force is controlled by the third seal 213 and, since this force is much larger than the net valve closing force, the inflation valve 101 is forced to assume the open condition shown in FIG. 2.

Once the poppet 170 starts to move in the opening direction, a major closing force due to inlet pressure at the second flat surface 172 is eliminated while pressure force acting at the first seal 211 is effective and acts in the opening direction. With the inflation valve 101 in the open condition, the pressure force acting on the second seal 212 is in the closing direction. However, since the first seal 211 is larger than the second seal 212, the resultant force is effective in the opening direction. Once the inflation valve 101 assumes the fully opened condition, actuation force from the gas or fluid of the pressurized container 110 is not required as the open condition can be sustained by the net fluid pressure force acting on the first seal 211.

Once the inflation valve 101 is opened and pressure in the pressurized container 110 is fully depleted, the inflation valve 101 can be re-set to assume the closed condition shown in FIG. 1, by an operator pulling on the poppet 170. Alternatively, a compression spring can be located in the main cavity 121 to ensure positive inflation valve 101 closing.

Technical effects and benefits of the features described herein are the provision of a valve with repeatable operational features, built-in test features, no regulatory issues and improved leak tightness.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An inflation valve, comprising:
    a valve defining main and command cavities and comprising first and second valve portions and a valve seat defining an outlet;
    a poppet disposed in the main cavity and comprising first and second rods extending therefrom and a piston, wherein the first rod engages with the first valve portion, the second rod extends through the valve seat and the second valve portion to an exterior of the valve and the piston is coupled with the second rod and is disposed in the command cavity; and
    a solenoid valve to normally prevent main cavity-command cavity fluid flow to engage the poppet with the valve seat by fluid pressure acting on the poppet in the main cavity and to permit the main cavity-command cavity fluid flow when energized to disengage the poppet from the valve seat by balanced fluid pressure acting on the poppet in the main cavity and on the piston in the command cavity to permit main cavity-outlet fluid flow.

2. The inflation valve according to claim 1, wherein the first valve portion is attachable to a pressurized container and defines through-holes by which the pressurized container pressurizes at least the main cavity.

3. The inflation valve according to claim 1, wherein the valve further comprises a manifold along an axial length of which the solenoid valve is disposed and by which the main and command cavities are fluidly communicative when the solenoid valve is energized.

4. The inflation valve according to claim 1, further comprising a manual actuator which is manually operable to disengage the poppet from the valve seat to permit the main cavity-outlet fluid flow.

5. The inflation valve according to claim 4, wherein the manual actuator is anchored on the second valve portion to engage with the second rod.

6. The inflation valve according to claim 4, wherein the second valve portion comprises sidewalls and a lid supported on the sidewalls and through which the second rod extends, and the manual actuator comprises:
    a pull tab;
    a fulcrum which is anchored on an exterior of the lid; and
    a lever which is pivotable about the fulcrum to engage with a distal tip of the second rod upon an external force acting on the pull tab.

7. The inflation valve according to claim 1, wherein the valve seat comprises a first flat surface and the poppet comprises a second flat surface corresponding to the first flat surface.

8. The inflation valve according to claim 1, wherein the first rod has a larger diameter than the second rod.

9. The inflation valve according to claim 8, wherein the balanced fluid pressure arises from the first rod having a larger diameter than the second rod.

10. The inflation valve according to claim 8, further comprising:
    a first seal by which the first rod sealably engages with the first valve portion;
    a second seal by which the second rod sealably engages with the valve seat;
    a third seal by which the piston sealably engages with the second valve portion in the command cavity;
    a fourth seal by which the second rod sealably engages with the piston; and
    a fifth seal by which the second rod sealably engages with the second valve portion.

11. An inflation valve, comprising:
    a valve defining main and command cavities and comprising first and second valve portions and a valve seat defining an outlet;
    a poppet disposed in the main cavity and comprising first and second rods extending therefrom and a piston, wherein the first rod engages with the first valve portion, the second rod extends through the valve seat and the second valve portion to an exterior of the valve and the piston is coupled with the second rod and is disposed in the command cavity; and
    a solenoid valve configured to:
        normally prevent main cavity-command cavity fluid flow to thereby cause the poppet to engage with the valve seat by fluid pressure acting on the poppet in the main cavity, and
        permit the main cavity-command cavity fluid flow when energized to thereby cause the poppet to disengage from the valve seat by balanced fluid pressure acting on the poppet in the main cavity and on the piston in the command cavity to permit main cavity-outlet fluid flow.

12. The inflation valve according to claim 11, further comprising a manual actuator which is manually operable to disengage the poppet from the valve seat to permit the main cavity-outlet fluid flow.

13. An inflation valve, comprising:
    a pressurized container;
    a valve defining main and command cavities and comprising a first valve portion defining through-holes by which the pressurized container pressurizes at least the main cavity, a second valve portion and a valve seat defining an outlet;
    a poppet disposed in the main cavity and comprising first and second rods extending therefrom and a piston, wherein the first rod engages with the first valve portion, the second rod extends through the valve seat and the second valve portion to an exterior of the valve and the piston is coupled with the second rod and is disposed in the command cavity;
    a solenoid valve to normally prevent main cavity-command cavity fluid flow to engage the poppet with the valve seat by fluid pressure acting on the poppet in the main cavity and to permit the main cavity-command cavity fluid flow when energized to disengage the poppet from the valve seat by balanced fluid pressure acting on the poppet in the main cavity and on the piston in the command cavity to permit main cavity-outlet fluid flow; and a manual actuator which is manually operable to disengage the poppet from the valve seat to permit the main cavity-outlet fluid flow.

14. The inflation valve according to claim 13, wherein the valve further comprises a manifold along an axial length of which the solenoid valve is disposed and by which the main and command cavities are fluidly communicative when the solenoid valve is energized.

15. The inflation valve according to claim 13, wherein the manual actuator is anchored on the second valve portion to engage with the second rod.

16. The inflation valve according to claim 13, wherein the second valve portion comprises sidewalls and a lid supported on the sidewalls and through which the second rod extends, and the manual actuator comprises:
   a pull tab;
   a fulcrum which is anchored on an exterior of the lid; and
   a lever which is pivotable about the fulcrum to engage with a distal tip of the second rod upon an external force acting on the pull tab.

17. The inflation valve according to claim 13, wherein the valve seat comprises a first flat surface and the poppet comprises a second flat surface corresponding to the first flat surface.

18. The inflation valve according to claim 13, wherein the first rod has a larger diameter than the second rod.

19. The inflation valve according to claim 18, wherein:
   the balanced fluid pressure force arises from the first rod having a larger diameter than the second rod, and
   a higher fluid pressure force at the first rod retains an open condition without actuation forces.

20. The inflation valve according to claim 18, further comprising:
   a first seal by which the first rod sealably engages with the first valve portion;
   a second seal by which the second rod sealably engages with the valve seat;
   a third seal by which the piston sealably engages with the second valve portion in the command cavity;
   a fourth seal by which the second rod sealably engages with the piston; and
   a fifth seal by which the second rod sealably engages with the second valve portion.

* * * * *